United States Patent [19]

Dankert

[11] Patent Number: 4,922,225

[45] Date of Patent: May 1, 1990

[54] AUTOMOBILE WARNING LIGHT IMPROVEMENT

[76] Inventor: Norman H. Dankert, 221 Decatur, Michigan City, Ind. 46360

[21] Appl. No.: 28,677

[22] Filed: Mar. 20, 1987

[51] Int. Cl.$^5$ .......................................... B60Q 1/44
[52] U.S. Cl. ................................... 340/467; 340/479; 200/538
[58] Field of Search ...................... 340/66, 67, 70–73, 340/87, 97, 479, 468, 475, 467; 200/67 E, 153 V, 61, 89, 342, 538

[56] References Cited

U.S. PATENT DOCUMENTS

| | | |
|---|---|---|
| 2,982,944 | 5/1961 | Weller .................................. 340/467 |
| 3,320,586 | 5/1967 | Wagner . |
| 3,336,450 | 8/1967 | Rainer . |
| 3,336,575 | 8/1967 | Lundahl ................................ 340/72 |
| 3,375,496 | 3/1968 | Antunovic . |
| 3,395,388 | 7/1968 | Hendrickson . |
| 3,414,879 | 12/1968 | Holland . |
| 3,501,742 | 3/1970 | Ellison .................................. 340/71 |
| 3,576,529 | 4/1971 | Garrison ............................... 340/72 |
| 3,806,870 | 4/1974 | Kalajian ............................... 340/71 |
| 3,881,078 | 4/1975 | Kazanecki ......................... 200/61.89 |
| 3,921,750 | 11/1975 | Shames .............................. 340/71 X |
| 4,034,338 | 7/1977 | Bevilacqua . |
| 4,107,647 | 8/1978 | Yoshino ................................ 340/71 |
| 4,115,671 | 9/1978 | Iijima ............................ 200/61.89 X |
| 4,149,141 | 4/1979 | Tanimura . |
| 4,224,598 | 9/1980 | Ostrowski . |
| 4,470,036 | 9/1984 | Doerr et al. ......................... 340/66 |
| 4,504,712 | 3/1985 | Donnelly et al. ............... 200/153 V |
| 4,575,782 | 3/1986 | Levine et al. . |
| 4,594,574 | 6/1986 | Thurman ............................. 340/467 |
| 4,600,913 | 7/1986 | Caine . |

Primary Examiner—Joseph A. Orsino
Assistant Examiner—Brian R. Tumm

[57] ABSTRACT

An improved system for lighting an automobile central rear window warning, or "third" red light, employs an unlimited linear motion switch coupled to the accelerator-carburetor linkage and a logic unit coupled to the switch and the electric lines for the conventional brake, turn signal and back-up signal maps, and, optionally, to a clutch switch, so as to light the "third" warning lamp. The linear switch unit receives a rod in its housing, which rod is coupled to the carburetor or accelerator linkage. The rod rolls a spring-mounted roller to an off center position, thus activating or deactivating a pair of contacts upon any movement of the rod beyond a small increment. The linear switch rapidly responds to any reversing movement of the accelerator pedal, no matter what absolute position the rod is in at the time. The linear switch, in conjunction with the logic unit, serves to maintain the rear "third" red light "on" for all occasion when the automobile is being operated or is commencing to be operated in a manner which could be a danger to another vehicle approaching it from the rear. Thus, it lights in all normal conditions, plus reverse or turn signaling which may flash or hold steady depending on the positioning of the accelerator pedal. With a slight release of the accelerator pedal, any activation is maintained until the pedal is again depressed.

10 Claims, 5 Drawing Sheets

AUTOMOBILE WARNING LIGHT IMPROVEMENT

FIELD OF THE INVENTION

The present invention relates to systems for operating rear collision-avoidance warning lamps for automobiles and to switches that are especially useful for such systems.

BACKGROUND OF THE INVENTION

Close analysis of the present brake-sent message displayed on the rear-end of vehicles reveals that it has serious problems and needs correction. The message is not complete; it lacks uniformity both in its composition and in its pattern of display on various vehicles; under certain commonly occurring conditions it is even false. These deficiencies cause misinterpretation, not only of its message but also of the message from the other lamps.

In order to understand these problems, it is helpful to consider all the code systems used on the rear-end of vehicles. All of these codes provide information about how a vehicle relates to its path. The message of the presence (tail) lights is primarily that of coution—a vehicle is present on the path. This message is sent by lower, red side-lamps. Since red lamps are not used on the front-end of vehicles, the presence lights include a second message: that the rear-end is being observed.

The turn signals indicate caution—a vehicle is about to converge with or diverge from its path. This message is sent by a flashing bright over-ride through the lower red side-lamps or through separate adjoining yellow lamps. Reverse lights are white lamps intended mainly to make the path visible to the driver for the reverse maneuver. When present on a vehicle, these lights indirectly signal caution, this vehicle may be proceeding in reverse. These lights are not easily visible during daylight, and, thus, unless a red lamp is activated, during adverse conditions, the rear-end presents itself as a front-end proceeding forward.

The remaining messages have to do with path-following. Path-following exists in two major phases: (1) joining the flow (flow-pursuance); (2) resisting the flow (flow-impedance). Flow-impedance consists of four phases: (a) warning prior to slowing, (b) slowing, (c) being stopped, and (d) proceeding in reverse.

The path-following information currently available is limited to what is suggested by the depression of the brake pedal. Depression of the brake pedal will show the intent to slow down as well as the condition of being stopped. More generally stated, this message is caution—you are about to impede the flow of traffic. When the brake pedal is not depressed, the off-condition of the lamp naturally suggests the message opposite of flow-impedance—that the vehicle is joining the flow. This message, however, has a serious problem. When the brake-activated lamp is out, the vehicle is not always joining the flow. Additional observation on the driver's part is then required to confirm the lamp's message: to see what the vehicle is actually doing, that it is really joining the flow, or is slowing, or is stopped.

This arrangement has a deficient message dependent for its clarification on the driver's observation of his surroundings. Such a dependency leads to the message being improperly decoded as driving conditions deteriorate and it becomes more necessary to rely solely on the lamps for information. This happens in traffic jams where drivers almost exclusively focus their attention ahead on the brake generated message. As soon as the lead car's brake light goes out, drivers accelerate forward and then immediately apply their brakes, in panic, when they discover that the lead car has not joined the flow. This same method of decoding is also noticeable in connection with the use of the turn signals, where drivers do not take the turn signals seriously until they see a foot-brake application. This may or may not happen; when it does, it often occurs after considerable engine braking.

In view of the mentioned problems, it has been suggested that an extra central rear red "third" brake warning light be employed on automobiles, especially on the common passenger car. The U.S. Department of Transportation has now mandated a central brake light unit in or at the level of the rear window to be original equipment on all new automobiles sold in the U.S.A. An example of such a light unit is shown in U.S. Pat. No. 4,575,782, issued on March 11, 1986, to Levine, et al.

Others have suggested such a central light, including the present inventor in U.S. Pat. No. 3,364,384, issued on January 16, 1968. That light included provision for signaling deceleration. Other warning light systems are shown in U.S. Pat. Nos. 2,853,572; 3,105,884; 3,320,586; 3,336,450; 3,395,388; 3,414,879; 3,501,742; 3,806,870; 4,034,338; 4,149,141; 4,173,012; 4,224,598; 4,463,411; 4,470,036; 4,600,913; and 4,602,320. See also U.K. Patent 2,028,024 to H. Moffat and West German Patent 3,026,674 to Dietlicher. These units often employ a number of different colored lights for different situations, involving the problem of re-educating drivers in general to their meaning. They also are objected to as being distracting. Often, fears of highways lighting up like Christmas trees are stated as arguments against such systems.

The current Department of Transportation-mandated brake lamp or light, although a step forward in highway safety, does not provide for many common dangerous conditions, and to the extent it becomes accepted, it may well lead to unfortunate over-reliance on it by drivers. For example, if a vehicle equipped with such an extra brake light stops on a highway, the drivers approaching from the rear will see the extra light, only so long as the driver keeps his or her foot on the brake pedal. However, if that same driver decides to back up (an even more dangerous condition for rearward-approaching cars), the rear warning light goes out —a condition that could easily be misinterpreted by an approaching vehicle and result in collision.

All the problems that attend the path-following message, for a system which must use only a single lamp, can be corrected by doing just two things: All vehicles should have a centrally located high-mounted lamp and the message of the lamp should be that, on normal roads, it would be off only when actually joining the flow, no matter what the transmission. This means that it can be on whenever it seriously resists the flow. It would be on in reverse, when stopped; and it could be on for all serious instances of slowing. As an advance warning for lane changing, it would be on flashing steady as prescribed by the position of pedal before slowing. This advance warning also helps interpret the message from the side lamps. Apart from the turn signal use, it would show foot-brake slowing and engine braking as initiated by a foot brake application. After the lamp is on for any of these reasons, it cannot be cancelled until the vehicle accelerates forward, beginning at any speed.

Central to creating this total effect is the correct use of the accelerator. The accelerator must not be made to send any message merely upon its release, which would be to use a deceleration switch. The message sent solely by such a switch over-loads a single lamp with too many activations that do not result in flow-impedance. These extraneous, false message lead to confusion.

The correct use of the accelerator employs, instead, an accelerator switch. This switch will cancel any flow-impedance message only upon depression of the accelerator, and that at any speed whatsoever, thus always having the lamp out whenever joining the flow.

This switch, used only in conjunction with all serious instances of impedance, will produce a simple message that is reliable and, of greatest importance, never false. It will send exactly the same messages that the present lamp sends but more of them. This extra time is not a matter of just being on longer, but rather of being on when needed. Even increased, this time span is still minimal but incorporates all the information required to prevent misinterpretation of both its message and that of the other lamps.

SUMMARY OF THE INVENTION

The present invention provides a system for controlling the standard extra warning lamp which system can light that lamp in all dangerous conditions.

The present invention encompasses a kit and method for easily retrofitting an existing automobile already equipped with a Department of Transportation extra rear or "third" red light, so it will respond to additional dangerous conditions while maintaining that lamp's essential brake light function.

A kit constructed in accordance with the present invention includes means for developing an accelerator pedal signal (such as a switch couplable to the carburetor linkage) and means for mounting it in an automobile. Also provided is a logic circuit unit having an output and at least accelerator signal, brake signal, and reverse signal inputs, and, optionally, the right and left turn signal inputs. The logic unit develops, in conjunction with the accelerator signal, an output signal on its output when any one or more of its inputs receives a signal. Means such as connectors and wires, are provided for mounting and connecting the components so as to control the "third" red lamp to respond to a definite set of conditions.

A second and significant feature of the present invention is a switch unit which is operated by the travel of a linear movement member (such as a rod), independent of the absolute position of the linear member, when it reverses its direction of travel at any point.

The invention, together with the advantages thereof, may best be understood by reference to the following description, taken in connection with the accompanying drawings, in the several figures of which like reference numerals identify like elements.

DETAILED DESCRIPTION OF TWO PREFERRED EMBODIMENTS

Figure 1:
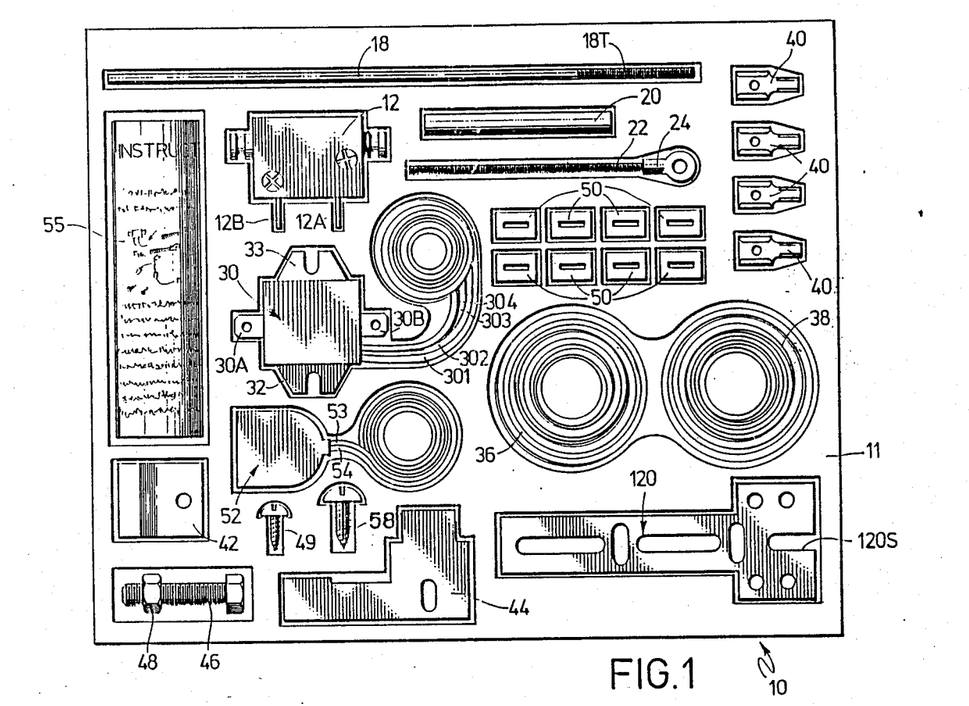
FIG. 1 is a plan view of a kit of parts in a container, which kit is constructed in accordance with the present invention.
Figure 2:
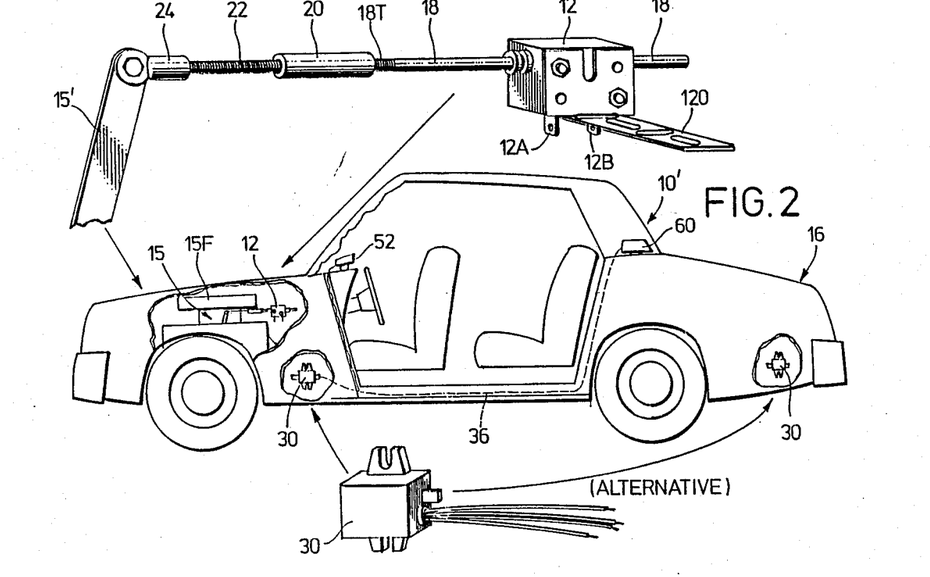
FIG. 2 is a side view, partly broken away, of a passenger automobile equipped with a rear window level brake light, with parts of the kit of FIG. 1 and the location of installation illustrated at broken away portions of the automobile and by exploded enlarged scale partial views.
Figure 3:
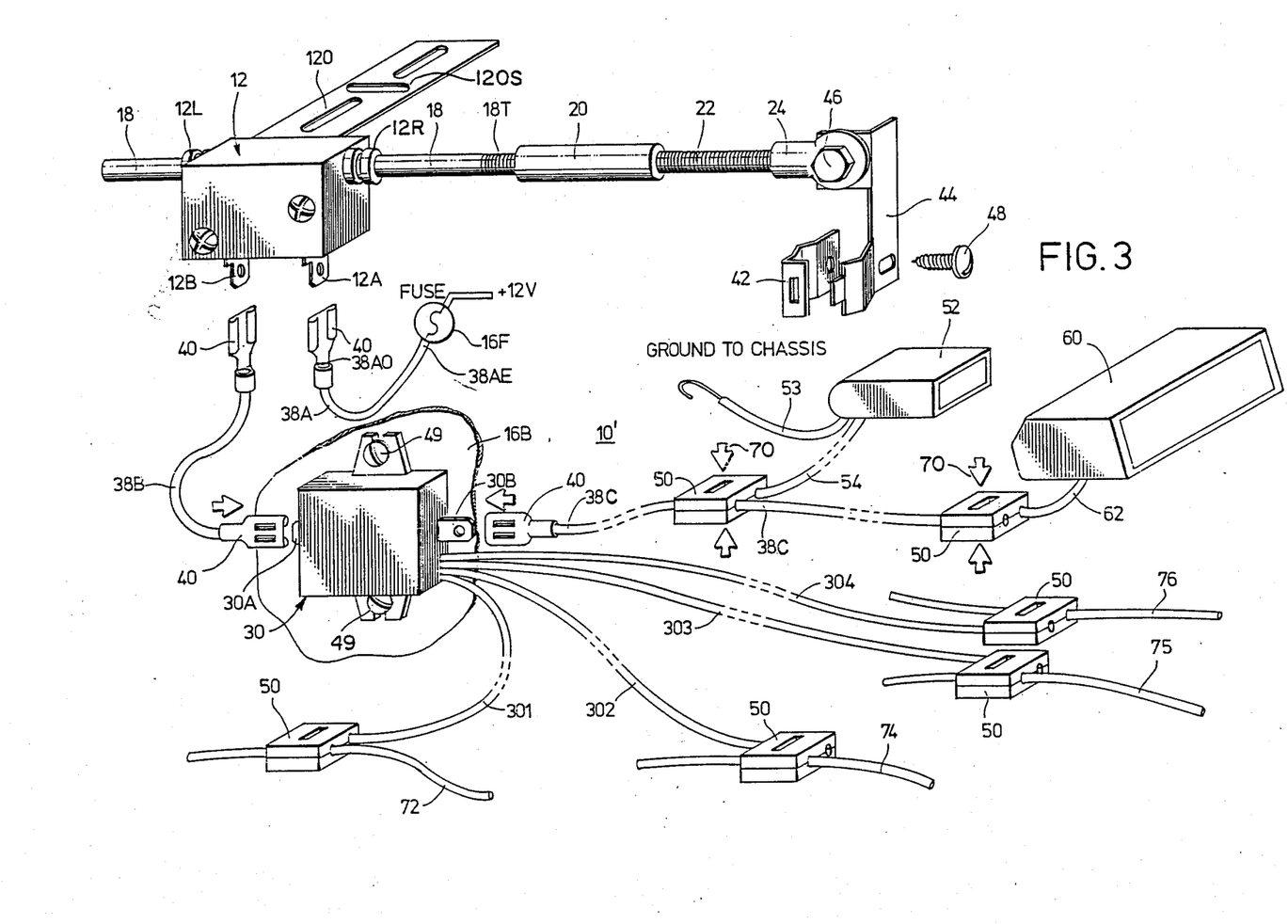
FIG. 3 is a hybrid view, partly in perspective and partly in schematic, of the parts of the kit of FIGS. 1 and 2 and some parts of the automobile of FIG. 2, which hybrid view is useful for illustrating the connections to be made and steps taken to connect the parts into the automobile.

Referring to FIG. 1, there is depicted a kit generally designated by the number 10, which kit 10 is constructed in accordance with the principles of the present invention. The kit 10 is shown positioned in a container or package 11 and includes a linear switch unit 12 whose construction and operation will be explained in detail below, under the heading "The Switch Unit 12". A universal mounting bracket 120 for mounting the unit 12 is provided. The bracket 120 may be bent into different shapes to accommodate different locations and for securing the unit 12 at any number of convenient locations, near an automobile's carburetor (such as the carburetor 15 of the sedan automobile 16 shown in FIG. 2) or else near another part of the accelerator linkage of the automobile. The switch 12 receives a rod 18 which indirectly activates it on and off, that is, to open and close a circuit path between a pair of terminals 12A and 12B of the unit 12. The rod 18 is, as shown, threaded at one end 18T so as to allow it to be connected to a turnbuckle unit 20, which may also recei244 22 also receives at its other end an eye member 24. (These parts 24, 22, 20, and 18, may be assembled together as shown in FIGS. 2 and 3.)

The kit 10 also includes logic unit 30 whose construction and operation will also be detailed below in conjunction with the description of FIGS. 4 and 4A. The unit 30 includes a pair of terminals 30A and 30B and four insulated wires 301, 302, 303, and 304. Mounts for mounting are provided 32, 33, which also serves as ground connections, when secured in place as will be explained later. The wires 301–304 are preferably about eighteen inches long and may be colored differntly, e.g., yellow, blue, green, and brown.

Further included in the kit 10 are two coils 36, 38 of insulated electric wire. The coil 36 is preferably about fifteen feet in length and has its insulation colored black. The coil 38 is preferably about ten feet in length and preferably has a distinctively-colored insulation, such as red.

The kit 10 also included four terminal clips 40 sized to slide onto and be held onto the teminals 12A and 12B of the switch unit 12 and the terminals 30A and 30C of the logic unit 30 and having crimp connectors sized to accept the wire of either of the coils 36, 38.

Further included in the kit 10 is a mounting clip bracket 42 and clamp member 44 which may be used to help mount the switch 12 or the rod eyelet 24 (as shown, for example, in FIG. 3). A bolt 46 and nut 48 are also provided for aiding in mounting the switch 12, as are one large self-tapping sheet metal screw 58 and one small self-tapping sheet metal screw 49 for use in mounting and connecting the components.

Six wire connectors 50 are provided, sized to connect the wires of coils 36, 38. One suitable connector for coils 36, 38 of #18 wire is colored red and designated as Model No. 53440-2 for 20-18 gauge wire, manufactured by and currently commercially available from A.M.P.

Also provided in the kit is an l.e.d. monitor unit 52 with a self-adhesive housing and a pair of insulated lead lines 53, 54 (preferably a five-foot length of #24 standard wire and a two-foot length of the same type of wire for connecting to chassis ground).

As will be explained below, the kit 10 may include an optional microswitch for activation by the clutch pedal of a manual-shift car, and for some other types of vehicles, longer wires or extension wires may need to be employed. A set of instructions 55 is also provided for allowing the purchaser of a kit 10 to install the apparatus onto a motor vehicle such as the vehicle 16 shown in FIG. 2.

The instructions 55 provide for the major components, i.e., the switch unit 12, the logic box, unit 30, and the monitor 52, to be mounted as indicated in FIGS. 2 or 3. These instructions 55 could be as follows:

INSTRUCTIONS:

The third brake light control system consists of three interconnected parts: a logic box 30, an accelerator motion switch 12, and a monitor 52. Wire, connectors, brackets, and hardware are included for normal installation in most vehicles. The switch 12 is installed under the hood in parallel with the carburetor linkage 15 (or under the dash coupled to the accelerator pedal linkage). Proper orientation of this switch is very important. The logic box 30 may be located behind the left kick panel or in the trunk. The placement behind the kick panel is preferred, because all necessary wires are routed through this area in most cars. The monitor 52 consisting of an l.e.d. is located on the instrument panel for easy viewing by the driver.

INSTALLATION:

Wiring the 3rd Brake Light

1. Run a wire 36-black from one terminal on the 3rd brake light 60 to the kick panel on the driver's left.
2. If the 3rd brake light 60 is not already grounded, take the other wire out of the light and attach it to bare metal.

Wiring the Logic Box

Passing by the kick panel is a wire harness that contains the following wires: (1) a wire to reverse lights, (2) two wires to turn signals, (3) a wire to brake.

3. Determine which wires are which and attach them (using connectors 50) to their appropriate terminals on the logic box 30. (See FIG. 3.) (The monitor 52 may be used to locate these wires by operating each component and connecting the monitor 52 temporarily to the wires.)

4. Ground the logic box 30 by securing it to metal of the automobile's chassis using the sheet metal screws provided.
5. Attach a wire 38B red to the switch terminal on the logic box 30A and run this wire through the fire wall to the accelerator linkage area.

Attaching and Wiring the Roll-o-matic ™ Switch

6. Remove the air filter 15F (FIG. 2) if necessary from the carburetor 15 and locate the moveable area 15 on the carburetor. Find a desirable fixed position offered by the engine block. The housing of the cable is usually sufficient. Measure the distance between these two points. Assemble the switch 12 and its extension 18, 20, 22, 24 to the approximate distance determined by this measurement.
7. Attach the switch 12 (using bracket 120 if needed) so that it is both parallel to the linkage and has the arrow on it aimed with down movement of the accelerator pedal. The bracket 120 may be bent at various locations to aid in mounting the switch 12.

Wiring the Switch

8. Attach the wire 38B coming through the fire wall to the switch 12.
9. Attach another wire 38A to the remaining terminal on the switch 12 and the ignition.

Attaching and Wiring the Monitor 52

10. Attach the monitor 52 at any easily visible place on the instrument panel. Wiring can be hidden by bringing the wires between the trim and molding on the dashboard.

Wiring the Monitor

11. Attach one end of the long wire 54 coming from the monitor 52 to the wire 38C going to the third brake light.
12. Ground the other, shorter wire 53 from the light.

INSTALLATION CHANGES FOR PLACING LOGIC BOX IN TRUNK

Wiring the 3rd Brake Light 60

1. Cut the non-powered wire 62 running to the 3rd brake light 60. Tape the wire end not connected to the 3rd brake light and coil and secure it in a safe place.
2. Connect the end of that wire (which is still connected to the 3rd brake light 60) to the wire 38C (see FIG. 3).

Wiring the Logic Box 30

3. Run 2 wires (38B and 38A) up front:
   a. one from the switch terminal on the logic box 30 run through the fire wall to the accelerator linkage;
   b. the other from the wire 38C going to the 3rd brake light 60 and running to the monitor 52 on the dashboard.

The physical connecting-up of the kit 10 into the automobile 16 to form an operating system is illustrated in FIG. 3. Referring to that figure, it can be seen that the eyelet 24 may be connected to the accelerator pivot using the bolt and nut 46 and the clip 44 and clamp 42 or any other suitable connection. In some cases, the existing carburetor (or accelerator pedal) linkage may be simply disassembled and reassembled with the eyelet 24 slipped over a crank arm. The switch unit 12 may be mounted, e.g., using the member 120.

The rod 18, turnbuckle 20, and rod 22 are then attached together, and the rod 18 run through the opening in sleeve 12R and out the opening in sleeve 12L of the switch unit 12.

The logic unit 30 is then mounted using the self-tapping screws 49 (into a newly-drilled hole in the chassis or body 16B) or using a convenient pre-existing bolt of the body 16B. Such are usually readily available in both preferred areas of installation for the logic unit 30.

A length of insulated wire 38A is then cut from the coil 38 (red) to run between the fused side of a fuse box (normally located under the dash) to the switch unit 12. One end 38AE is stripped and electrically and physically connected to any convenient pre-existing fuse 16F which operates with the ignition switch (since this system, when installed, draws little more current than the third light itself which draws a relatively small current, no special fuse is needed, and any of the normal light fuses may be used, since they all have a margin of safety that will easily accept the small added current without overloading any of them). Insert devices for tapping into a fuse holder at the fuse box are known and may be employed. The other end 38AO of the wire 38A is also stripped, and one of the connectors 40 crimped onto the stripped metal wire so as to form a good electrical and mechanical connection. This connector 40 is then pressed into a terminal 12A of the switch 12 as indicated in FIG. 3.

A second length of wire 38B is then measured and cut from the coil 38 sufficient to run between the switch unit 12 and logic unit 30. This length 38B then has its ends stripped and terminals 40 similarly crimped thereon. (This is preferably done after the wire has been run and placed in the automobile, since it will be easier to feed the wire 36B through holes formed in fire walls, etc., without the terminal 40 being attached.) One end of the wire 38B is then connected to a terminal blade 12B of the switch by pressing on the terminal 40 and the other end similarly connected to the terminal blade 30A of the logic unit, both as indicated in FIG. 3.

A length 36A of black insulated wire 36 is run between the logic unit 30 and the pre-existing line 62 controlling the "third" light unit 60. One end is stripped and a blade connector 40 attached, and this is pushed onto the blade 30B, as shown in FIG. 3.

At the other end of the wire 38C, the line 62 is cut, and the portion leading to the light 60 is connected to the end of the wire 38C using a press connector 50, as illustrated in FIG. 3. (Such connectors are well known and will not be described in detail. To operate, it is only necessary to lay lengths of conventional lines, such as lines 62 and 38C, within adjacent receiving elongated depressions and to press-assemble the parts of the connector together. This act causes a metal conduit to pierce into both lines and electrically connect them.) The other loose end section of line 62 has its end taped with electrical tape and coiled up in some convenient spot in the trunk, as it is no longer needed.

The monitor 52 is optional in the sense that the system 10 will work just as well without it as with it. (Also, it may be mounted on the rear deck of the automobile facing the driver, so that its small red light will appear in the driver's rear-view mirror.)

If desired, the monitor 52 may be mounted to a convenient position on the dash (FIG. 2) and its line 54 run to a convenient part of the line 38C. If the logic unit is mounted at the front of the automobile (FIG. 2), this will be a short run, and excess wire 54 may be cut off and discarded. If mounted in the trunk or at the rear of the automobile (FIG. 2), then this line 54 is run (preferably parallel to and at the same time as the line 38C) to the trunk and using a connector 50 connected to the line 38C pressing together its parts as shown by the arrows 70 in FIG. 3.

To complete the connection of the system 10, the wires 304, 303, 302, and 301 need to be respectively connected to the existing right and left turn signal lines 72, 74, the existing back-up light line 75, and the existing brake light line 76. (Note the order of connection is not critical, just so long as a different one of lines 301–304 is connected to a different one of lines 72, 74, 75, and 76.) (If the logic unit is mounted near the "third" brake light unit 60, the other free end of the severed line 62 can be used instead of tapping into the line 76.) The lines 304, 303, 302, and 301 are connected by different connectors 50 in FIG. 3. This plus perhaps some taping and tying up of any exposed or loose wire completes the installation of kit 20 to form the system 10.

Figure 4:
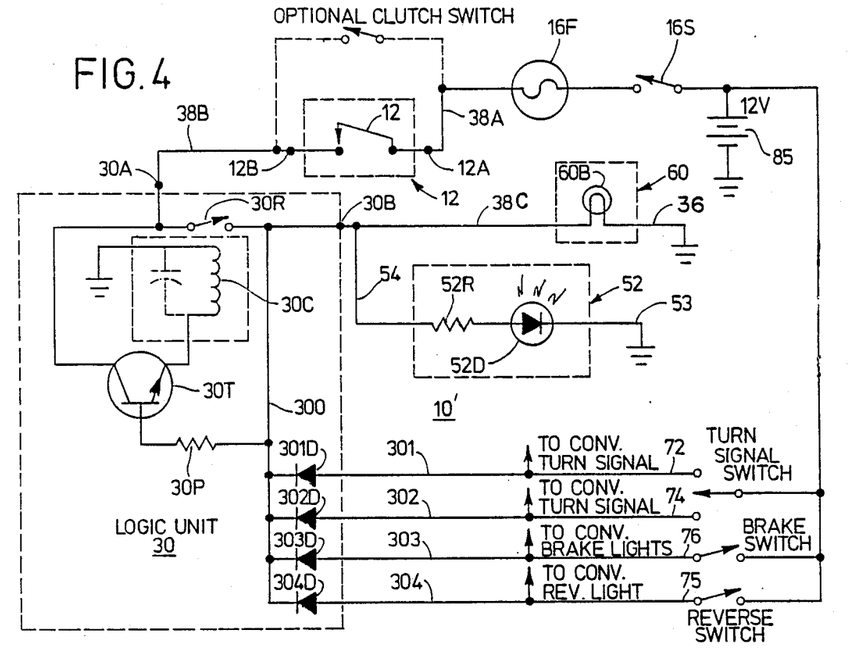
FIG. 4 is a circuit drawing of the connected kit of parts and the inventive system formed thereby.
Figure 4A:
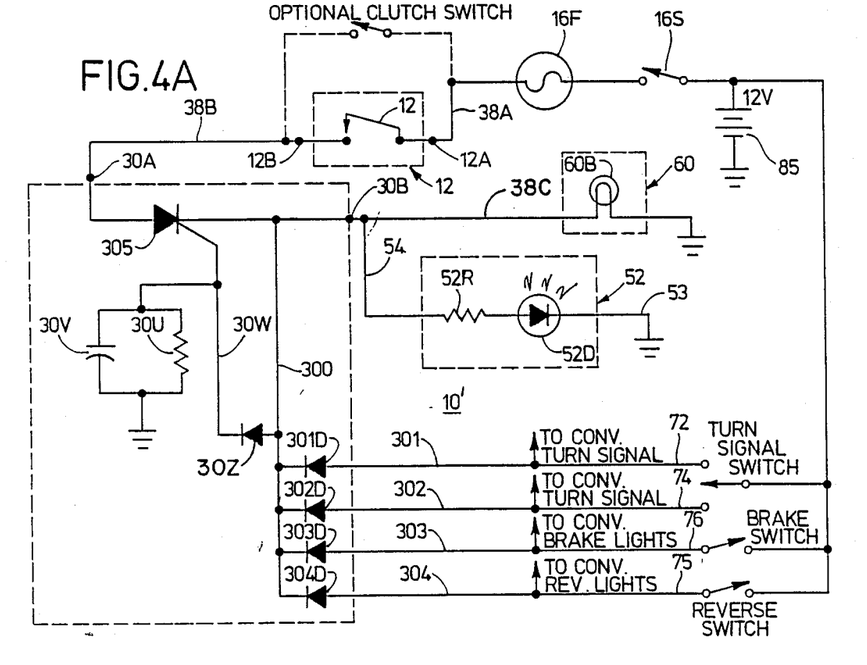
FIG. 4A is a diagram similar to that of FIG. 4, illustrating an alternative construction for one part of the system.

When used with a clutch-equipped vehicle, a clutch switch may be provided (or else, if one is already provided, its output may be tapped-into) to be wired in parallel with the switch 12 as shown in FIGS. 4 and 4A.

OPERATION OF THE SYSTEM

The operation of the system 10 may be appreciated from the circuit diagram of FIG. 4. This diagram is a full circuit drawing of the system 10 for operating the light units 60 and 52 and a somewhat simplified circuit diagram of the conventional automobile warning light control system. As this is well known, it is not necessary to show it completely here.

Tracing the circuit from the voltage source 85, whose negative side is connected to the chassis of the automobile, positive voltage is fed through the ignition switch 16S to the fuse 16F via the line 38A to the terminal 12A of the switch 12. The switch 12 serves to alternatively connect or not connect that voltage to its output terminal 12B and from there via a line 38B to the input 30A of the logic unit 30.

Within the logic unit 30, this input is connected to the collector of an NPN transistor 30T. The emitter of this transistor is connected to one side of a relay coil 30C whose other side is grounded. The relay coil 30C controls a normally open switch 30R which serves to connect or not connect the voltage on input 30A to the output terminal 30B. The base of the transistor 30T is connected through a current-limiting resistor 30P to a line 300 which is also connected to the terminal 30B.

An example of a suitable transistor for 30T is 2N2222 (e.g., MPSA 13), manufactured by G.E. - Motorola. A suitable example for the relay 30C–30R is T90N2D12, manufactured by Potter Brumfield.

The input lines 301–304 are also connected through isolating diodes 301D–304D in common and to the line 300.

The logic unit's output from terminal 30B is connected over line 38C to the lamp bulb 60B of light unit 60 to ground. (That is, the lamp unit 60 is grounded to the body of the automobile 16.)

As also shown in FIG. 4, the monitor 52 includes a light-emitting diode 52D whose cathode is connected to chassis ground via the line 53 and whose anode is connected through a current-limiting resistor 52R to the line 54 which is connected to line 38C.

With no voltage on any of the inputs 301–304 and the switch 12 open, no voltage is supplied to the circuitry of the logic unit 30 nor to the bulb 60B or the l.e.d. 52D, and they do not emit light. Now, assume the switch 12 closes and all else remains the same. This results in 12 volts being applied from the source 85 through the fuse 16F to line 30A through the now-closed switch 12 to the collector of the transistor 30T, which will not conduct. Therefore, contact 30R remains open, no voltage is applied to 60B or 52D, and the lamps do not emit light. However, when a second source of voltage is applied, simultaneously with the closing of switch 12, to any of lines 301 to 304, the coil 30C will be energized and serve to close the relay switch 30R and also connect voltage through lines 38C to the bulb 60B to ground, lighting that bulb, and through the line 54, resistor 52R, and the l.e.d. 52D to ground, to light it. Relay coil 30C will clamp on because of base voltage through resistor 30P until switch 12 is opened. (The diodes 301D–304D prevent that current from flowing to the lines 301 to 304, which, therefore, remain at essentially 0 volts, and their lamp bulbs do not light.) The application of voltage to the base of the transistor 30T through the resistor 30P has the effect of keeping the transistor 30T conducting, and therefore switch 30R closed, until the switch 12 opens upon depression of the accelerator pedal.

Now, assume that the switch 12 opens and all other inputs to the logic unit 30 carry no voltage. The removal of voltage causes the lamp 60 and monitor 52 to go "out" and the relay switch 30R to open as the relay coil 30C dissipates its energy.

(In the case of a vehicle equipped with the optional clutch switch, the operation of the circuit in response to the closure and opening of that switch would be the same as the opening and closing of the switch 12, just explained.)

Now, assume that, with no voltage applied to the system of FIG. 4, a turn signal is operated, causing the voltage in logic line 301 to rise to approximately 12 volts and fall back to "0" volts, as dictated by the conventional "flasher" unit (not shown). This voltage is applied via lines 38C and 54 to the lights 60 and 52 to light them. That is, both these lights also flash on and off with the turn signal light. The same effect occurs when the other turn signal is operated and when both turn signal lamps are operated by the conventional flasher switch.

The driver's applying the brake and closing the conventional brake switch also applies voltage and current (through line 303, diode 303D, line 300, terminal 30B, lines 38C and 54) to the lights 60 and 52 to turn them on. Similarly, putting the car into reverse closes the conventional switch on the automobile's transmission and applies power over the lines 75, 304 (through diode 304d, line 300, lines 38C and 54) to also turn on the lights 60 and 52.

Application of more than one of these inputs produces the same result as one of them. That is, if the switch 12 is closed and the brake line at 12 volts (the automobile brake switch closed), the lights 60, 52 remain on until both switches are opened. The operation of either of the turn signals and either or both of the steady sources (brake switch or reverse switch) maintains the lamps 60, 52 steadily "on".

The effect of this system 10 is to light the "third" brake light 60 whenever the brake switch is closed, just as it is done on conventional DOT mandated new automobiles. It also flashes that "third" light when either turn signal is operated, until switch 12 is closed. It also operates that light when the vehicle is put into reverse, even if the brake is not applied. The significant function of the switch 12 is that it holds the lights on until the accelerator pedal is depressed, causing switch 12 to open.

Alternative Circuit for the Logic Unit

In FIG. 4A, there is depicted an alternative circuit to the unit 30. This circuit differs in that the line 30A is connected to the annode of a silicon controlled rectifier (SCR) 305 whose cathode is connected to the lines 30B and 300. This scr 305 thus serves as a replacement for and does the same job as the relay switch 30R at the prior embodiment. The SCR 305 is turned "on" or conducting by the closure of the switch 12 after a suitable delay caused by the presence of an R-C parallel circuit made up of a resistor 30U connected in parallel to a capacitator 30V between the SCR control electrode and chassis ground. This electrode is also connected over a line 30W to the cathode of an isolation diode 30Z whose annode is connected to the line 300. The other circuitry remains the same as does the function. Suitable SCRs 305 may be those rated at 7 amps and manufactured by G.E. - Motorola. Resistor 300 may be 470 ohms and capacitor 30V 10 mfd.

The examples of specific components given herein are for definiteness and illustration and not for purposes of limitation of the scope of the invention. Also, the reader is cautioned that, while believed to be accurate, errors in compilation or translating these values and identifications may occur, and, therefore, he or she should use the wellknown means for verifying the reasonableness of these values and components. Further, while the set-out values, components, and arrangements are currently preferred, the present inventor may well decide, based on experimentation or for reasons of economy, to change from these in the future.

With this in mind, the following additional exemplary values and identification are given:

| | |
|---|---|
| L.E.D. 52 D | G.I. #MV6050 |
| Resistor 52 R | 470 ohms |
| Diodes 301 D–304 D | G.E. A1lF-M |
| | 306 amp - 40 volts |
| Resistor 30 P | 470 ohms |
| Transistor 30 T | 2N2222 |
| Relay 30 C–30 R | T90N1D12 12Y-1030A |
| | made by Potter Brumfield |
| Coils 36, 38 | Standard No. 18 |
| Clutch Switch | "Amy" brand micro-switch rated |
| | 5 amps, 2-3" arm, made by McGill |

A prototype kit was constructed using these components and installed in an automobile and shown to work well.

One key part of the system 10 is the switch unit 12. That switch is closed upon the driver's "backing off" of the accelerator pedal of the automobile 16, no matter what absolute position the pedal is in. How this can be achieved is shown in the next section.

The Switch Unit 12

The internal construction and operation of the unit 12 is best seen in FIGS. 5–8. Referring to those Figures and initially to FIG. 5, the switch unit 12 includes a main housing 121 of non-conductive material, such as diallyl pythalate—a molded phenolic with a TV-5 rating for fire protection. A cover 121C (FIG. 6) of the same material is provided. Within this housing 121 are received a first terminal and contact metal unit 122 (which projects outside of the housing 121 to form the connecting terminal 12A), a second terminal and pivot member 123 which forms the input 12B, a metal "teeter-totter" contact member 124, a saddle member 125, a roller member 126, and the rod 18.

Figure 6:
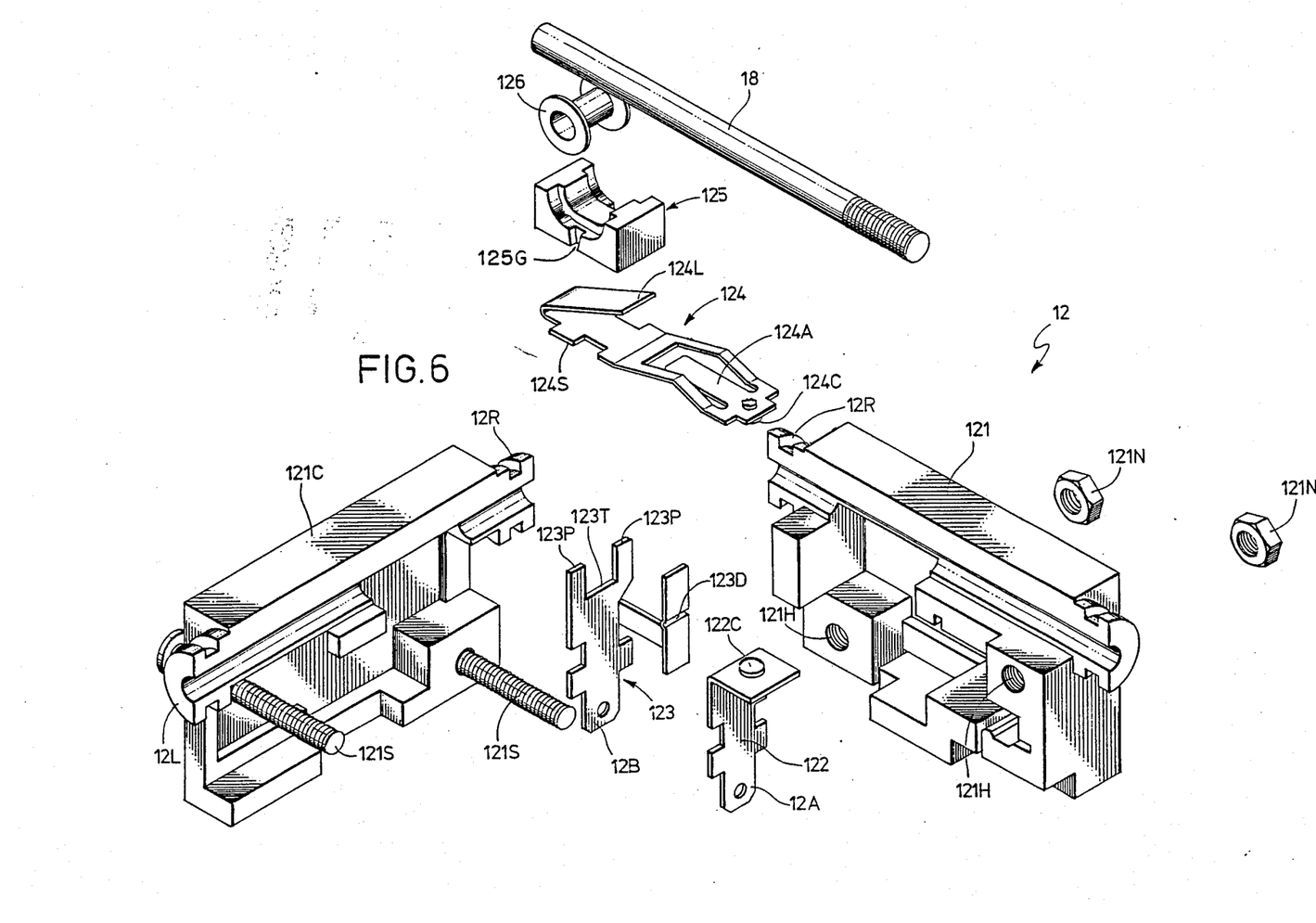
FIG. 6 is an exploded perspective view of the switch unit of FIG. 5.
Figure 7:
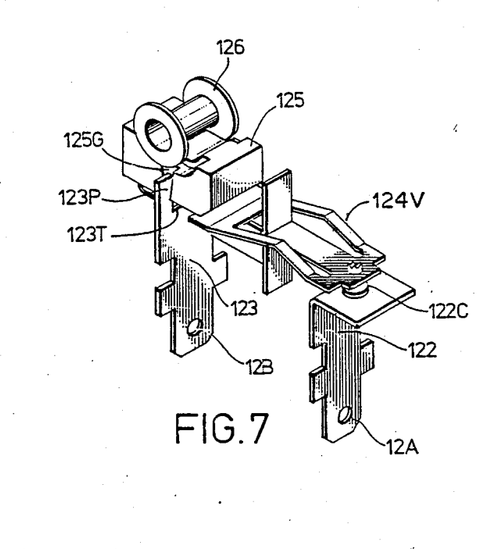
FIG. 7 is a perspective assembled view of the operational interior parts of the switch of FIGS. 5 and 6.

The construction of these parts and of the housing cover 121C and its connecting screws 121S is shown better in the exploded view of FIG. 6. The housing 121 is secured together by a pair of machine screws 121S which pass through smooth bores in the cover 121C and are received in threaded holes 121H in the main housing 121. These screws 121S preferably are longer than needed to only just secure the cover 121C to the housing 121 so they may extend out of the rear of the housing 121. A pair of nuts 121N are provided which can be threaded onto the projecting threaded ends of the screws 121S when the switch unit 12 is assembled. These nuts 121N may serve to secure the bracket 120 to the rear of the housing 121. The roller or wheel member 126 has a curvature which receives the outer surface of the rod 18 in a friction contact. The roller member 126 sits in the saddle member 125 and can roll a short distance in it from left to right as the rod 18 moves left or right. When it reaches either end of its range of positions, and the rod continues to move in that direction, the roller 126 spins in the saddle and/or allows the rod to continue to slip or slide by it for as long as the rod continues to travel in that one direction.

The saddle member 125 rests on a leaf spring 124L which supports the saddle 125 and urges it upward. The entire "teeter-totter" member 124 rests against and pivots on a cross bar 123T between a pair of vertical posts 123P and the top of the bar 123T which becomes the fulcrum for the member 124. The posts 123P are loosely received in grooves 125G in the sides of the saddle 125, allowing the saddle 125 to rock and travel up and down a short distance.

Figure 8:
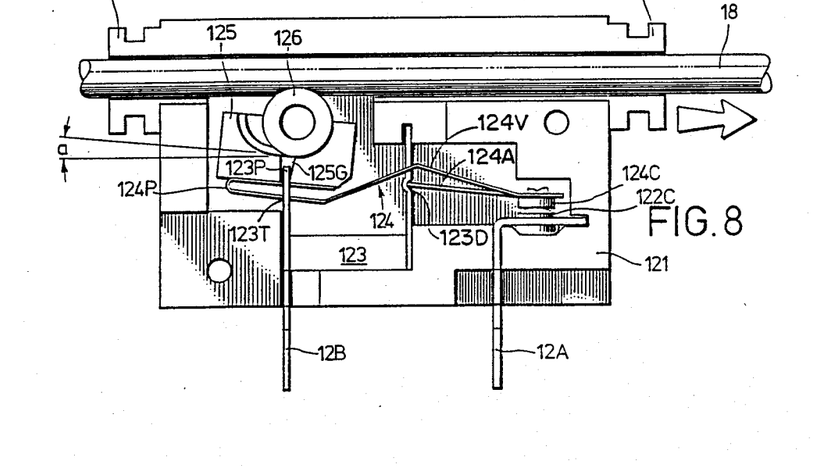
FIG. 8 is an elevational view similar to that of FIG. 5 of the switch unit with parts in moved positions.

The surface which the roller 126 travels on is slanted a slight angle "a", as indicated in FIG. 8. That is, relative to its base, the left side (see FIGS. 5 and 8) of the saddle 125 is slightly higher than the right side. in one working prototype, this angle was six degrees. Thus, the left side of the saddle 125 is pushed down as the roller 126 rolls from the position shown in FIG. 8 to that of FIG. 5 to produce a locking effect in that position.

This, plus the geometry of the saddle, causes the point 124P to move downward, causing the member 124 to pivot about the fulcrum 123T and raise the contact 124C of member 124 off of the contact 122C of the member 122 to break the electrical circuit from contact (via members 123 and 124) to contact 12B and 12A (via member 122).

The unit 124 is formed of spring metal and thus the section 124L serves as a leaf spring to bias the saddle 125 and the roller 126 upward into contact with the rod 18. The relaxed position of this spring is preferably above its (as shown in FIG. 8) operating positions when assembled, so as to always urge the saddle and roller upward.

The elasticity of the spring metal is such, however, that when the leaf 124L is pivoted downward approximately parallel to that of the section including part 124S (as shown in FIG. 8), the leaf essentially ceases to pivot about the area 124P and instead becomes as an inelastic member to further downward forces. Thus, the saddle 125 as it assumes the position of FIG. 8 rocks both the section 124L and the portion over the fulcrum 123T to "snap" the contact 124C downward.

As also best seen in FIG. 8, the member 124 is formed with a pair of side arms 124V which serve to spring bias rearward the contact 124C area and to urge the arm 124A into its groove 123D. The geometry of the groove 123D and arm 124A as shown in FIGS. 5 and 8, is such as to spring bias the contact 124C downward so that a good pressing contact is achieved against the contact 121C.

Figure 5:
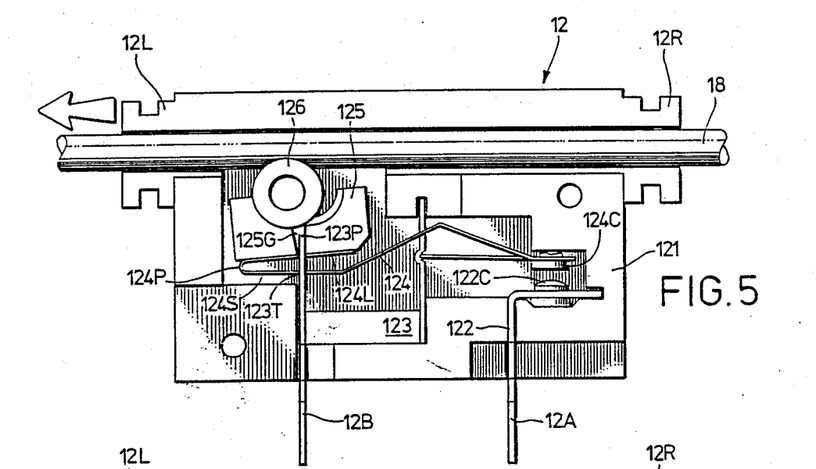
FIG. 5 is an elevational view of one part of the kit, namely, the linear switch unit of FIGS. 1-4, with its cover removed.

Reversal of the direction of travel of the rod 18 causes the roller 126 to move to the right (as viewed in FIGS. 5 and 8). In the process, member 124 will rock (pivot) between the pair of guide post 123P formed by vertical extensions of member 123. This closes contact 124C with 122C which is the natural position established by the blade of member 124. The tension of 124 will result as a snap action of the contacts. These contacts 122C and 124C remain in contact as long as the rod 18 is stationary or moves to the right, as seen in FIG. 8. However, when the rod 18 reverses direction sufficiently to roll the roller 126 to the left, it opens the contacts 122C–124C and returns the switch 12 to the open condition shown in FIG. 5.

This means that a small movement in one direction will cause the linear switch to close its contacts, if open, and a small motion in the opposite direction causes the contacts to open, if closed.

The use for this switch is not restricted to this one application but can have application anywhere microswitches are used and many other applications beyond these, e.g., sump pump control, garage door openers, etc.

Also, there is no normally open or closed position of the rod 18 with this switch, and the operating point is determined by the last position of the linear rod. And only a low activating pressure is required to obtain a relatively high amperage; thus, unlike other switches, there is no relation between (rod) pressure and amperage.

A prototype of this switch unit 12 has been constructed and tested and proven to function as desired. A presently preferred embodiment of the switch would have a housing 121–121C of about 1 ½ inches by 1 inch by ¼ inch (exclusive of the sleeve proportions 12L and 12R).

The blade unit 124 is preferably formed of about 0.006 sheet Beryllium copper spring metal with a contact 124C of silver cadmium oxide (⅛ by 1/32 inches in size). The overall size of formed member 124 is preferably about 0.1115 inch wide by ½ inch in overall length including the portion to which the contact 124C is secured.

The terminal units 122, 123 are preferably made of sheet tin plate 0.025 inch thick with the unit 122 made to be about 5/16 inch wide by 11/16 inch high, with the contact receiving area about 5/16 inch. The material and size of the contact 122C is preferably similar to that of the contact 124C. The terminal member is preferably about one inch by 0.425 inch by 0.425 inch by 5/16 inch, with an overall size with the dent 123D formed about 3/16 inch from its top and fulcrum 123T formed about ½ inch from the top. The posts 123P project upward about ⅛ inch from 123T and are spaced apart by about 3/16 inch.

The saddle 125 is preferably about 7/16 inch by 7/32 inch by 3/16 inch in overall size with post-receiving side slots of approximately 1/32 inch deep and approximately 0.028 inch wide at the bottom and opening up to about 0.044 inch. 3/32 inch above the base, there is an opening with ruts that receive the roller member 126. These ruts are approximately 1/16 inch wide. The roller 126 is preferably sized to fit this saddle.

The bracket 120 for mounting the switch 12 is preferably made of 16 gauge steel and is overall sized (before being bent by the user) to be about 4-⅜ inches by 1/12 inches. The longer section is preferably about 3-¼ inches and is slotted to receive 3/16 inch blots. The slot 120S is preferably about ¼ inch wide by about ⅜ inch.

The brackets 42 and 44 are preferably made of the same sheet metal and respectively sized to be about 2-½ inches by 1-½ inches, and 1 inch by 1-½ inches.

The above specific values are, of course, exemplary and may be varied broadly. They are set out here only to add definiteness to the disclosure and not to limit the invention nor the scope of the claims.

The necessity for this switch in the system described should now be apparent. The switch can be employed with existing equipment on automobiles, as well as with other equipment. For example, an additional indicator lamp may be connected in parallel with the lamp 60 as here connected. This additional lamp may be then mounted at the front of the automobile 12 and may, for example, emit a yellow light whenever the line to the light 60 is energized. Other useful variations and additions will no doubt occur to those skilled in this art.

While particular embodiments of the invention have been shown and described, it will be obvious to those skilled in the art that changes and modifications may be made without departing from the invention, and, therefore, the aim in the appended claims is to cover all such changes and modifications as fall within the true spirit and scope of the invention.

For example, the switch unit 12, instead of having a single fixed contact 122C, might include a second fixed contact at the upper position of travel for the contact 124C (which could be made to mate with both fixed contacts) and a terminal connected thereto so as to close this alternative circuit from terminal 12B after opening the circuit to terminal 12A.

I claim:

1. A signal light system for use in an automobile having a conventional rear window "third" brake light, accelerator linkage, a brake light control line, right and left turn signal control lines, a reverse light control line, and a source of electrical energy, by extending the conventional automobile "third" brake light to signal not only while braking but also during other adverse conditions, comprising:
    a roller activated switch for developing an accelerator motion signal;
    means for operably mounting the roller activated switch to the accelerator linkage in the automobile:
    a logic circuit having an output terminal and at least an input for a brake signal and an input for a reverse signal, which when properly connected produce an output on the output terminal, the logic circuit including means for latching the output on the output terminal when the accelerator motion signal from the roller activated switch is energized in conjunction with the brake signal input or the reverse signal input;
    means for inter-connecting the accelerator motion signal, the brake light control line, the reverse light control line, the turn signal control lines, and the source of electrical current with the logic circuit;
    means for connecting the logic circuit output to the "third" brake light so as to control it to be "on" or "off" depending on the output from the logic circuit.

2. The signal light system of claim 1, wherein the roller activated switch has a pair of terminals and is activated by a roller member which is positioned by a moving member such that the switch changes its state of conduction or non-conduction between the terminals in response to the reversal of direction of travel of the moving member, regardless of the position of the moving member when such reversal occurs.

3. The signal light system of claim 2 wherein the logic circuit includes isolation diodes connected from the brake and the reverse signal inputs so that electrical energy from one of the inputs is not fed out to the other inputs.

4. The signal light system of claim 3, having said right and left turn signal control lines wherein said logic circuit includes right and left turn signal inputs with isolation diodes in the right and left turn signal inputs.

5. The signal light system of claim 1 wherein the switch comprises:
    a moveable member which is to be driven from outside a housing of the switch to move back and forth along a defined path;
    a roller member within the housing and having means for contacting the moveable member and being moved thereby, the roller member being mounted for movement between a first and a second position; the roller member being so coupled to the moveable member that movement of such moveable member in one direction for a short distance will move the roller member over a pivotal point of a fulcrum from its first position to its second position, but continued movement of the moveable member in that one direction will result in the roller member remaining in the second position, and wherein movement of the moveable member in its other direction for a short distance will move the roller member over the fulcrum from the second position to the first position, but continued movement of the moveable member in the other direction will result in the roller member essentially remining in the first position; and
    the housing, which is composed of non-conductive materials, encloses and mounts a pair of conductive terminal members which serve as a pair of electrical terminals, and the terminal members projecting from within the closed housing to the outside of the housing, and said housing receives the moveable member and defines the path therein for the moveable member which projects out of the housing; and
    electrical contact means responsive to the movement of the roller member between said first and second positions for closing and opening an electrical conduction path between the terminals.

6. In combination with an automobile having a rear window-high "third" brake light, accelerator linkage, a brake light control line, a reverse light control line turn signal light control lines, and a source of electrical energy comprising:
    roller activated switch for developing an output signal in response to movement of the accelerator linkage;

means for mounting the roller activated switch in the automobile;

a logic circuit having, a roller activated switch input, a brake signal input, and a reverse signal input, and an output terminal, wherein the logic circuit produces a signal on the output terminal when said inputs are energized, and also produces a held on signal on the output terminal when the roller activated switch output signal is received in combination with a brake signal or a reverse signal has been inserted; means connecting the roller activated switch to the source of electrical energy and to the logic circuit, and for connecting the brake signal input to the automobile brake light control line, and the reverse signal input to the reverse light control line; and turn signal inputs to the turn signal control lines; and means connecting the logic circuit output to the "third" light so as to control it to be "on" or "off", depending on the output from the logic circuit.

7. The combination of claim 6 wherein the roller activated switch is a switch unit having a pair of terminals, and the switch is activated by a roller member positioned by a moveable member such that the unit changes its state of condution or non-conduction between the terminals in response to the reversal of direction of travel of the moveable member, regardless of the position of the moveable member when such reversal occurs.

8. The combination of claim 7 wherein the logic circuit includes means for latching on its output so as to produce the held on signal on the output terminal to operate the "third" brake light.

9. The combination of claim 8 wherein the logic circuit includes isolation circuits so that electrical energy from one of the inputs is not fed out to the other inputs.

10. The combination of claim 8, wherein the logic circuit includes isolation diodes connected to the inputs.

* * * * *